E. A. ARNOLD AND B. E. ROTHIG.
AUTOMOBILE BUMPER.
APPLICATION FILED MAR. 29, 1920.
1,354,273.  
Patented Sept. 28, 1920.
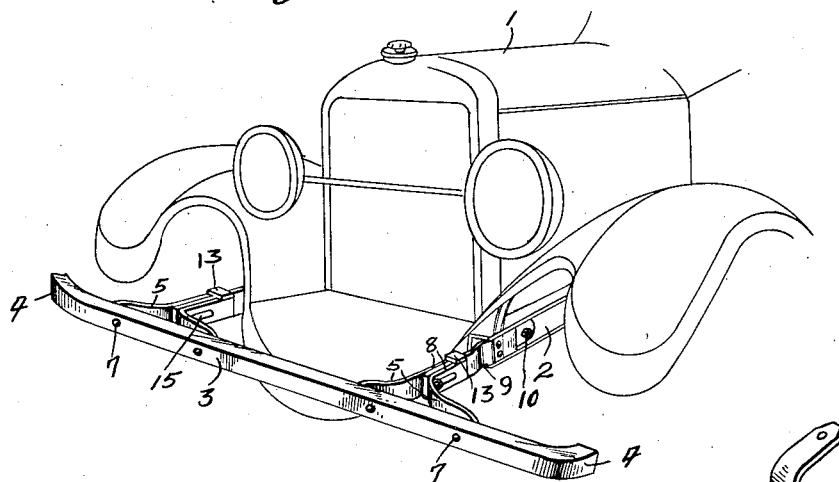
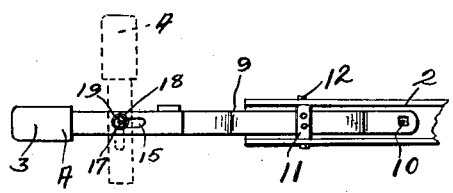
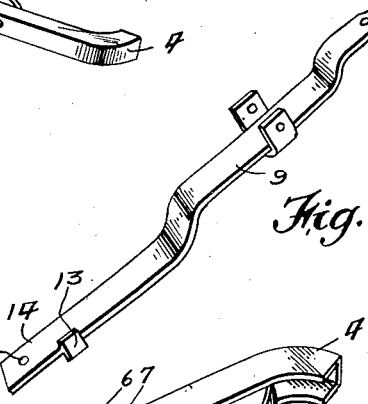
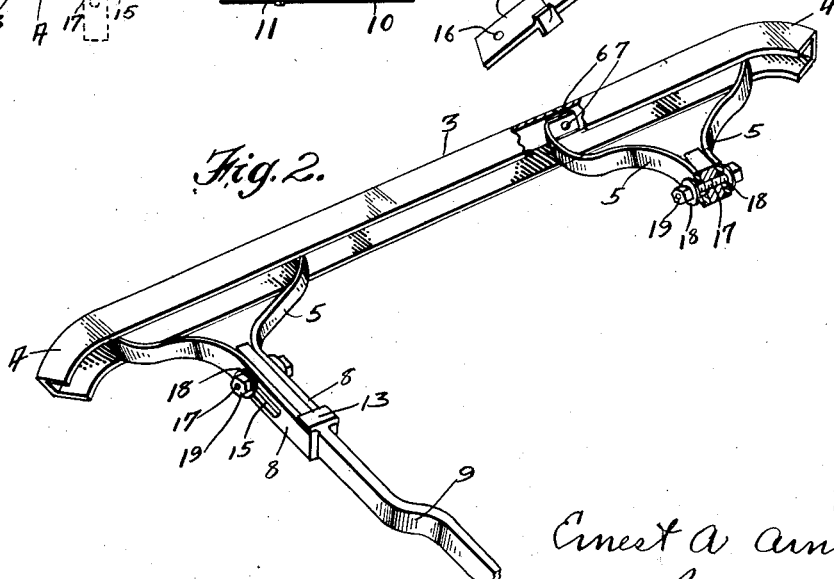
Inventors  
Ernest A. Arnold  
and Bruno E. Rothig,  
By Knight Bros  
Attorneys

UNITED STATES PATENT OFFICE.

ERNEST A. ARNOLD AND BRUNO E. ROTHIG, OF EAU CLAIRE, WISCONSIN.

AUTOMOBILE-BUMPER.

1,354,273.

Specification of Letters Patent. Patented Sept. 28, 1920.

Application filed March 29, 1920. Serial No. 369,698.

*To all whom it may concern:*

Be it known that we, ERNEST A. ARNOLD and BRUNO E. ROTHIG, citizens of the United States, and residents of Eau Claire, in the county of Eau Claire and State of Wisconsin, have invented certain new and useful Improvements in Automobile-Bumpers, of which the following is a specification.

Our invention relates to bumpers or fenders for automobiles, and more particularly to a bumper which may be swung vertically on horizontal pivots to facilitate the starting of the car by cranking the same.

It is ofttimes difficult for the operator of a motor vehicle to conveniently start the motor by cranking at the front of the car, because of the fender, which invariably is in such a position that it is impossible to revolve the crank handle and start the motor.

With our improved bumper, this difficulty is overcome, as we are enabled to move our bumper vertically to a position which provides convenient access to the crank handle.

The object of our invention is to provide a bumper of this type which may be easily adjusted to the car without the necessity of changes in the front construction of the standard types of automobiles. Our bumper is also constructed so that it is capable of slight adjustments to overcome the imperfections in the joints, thereby enabling the manufacture of these bumpers without giving special concern to the exact dimensions and positions of the pivotal connections.

Many other objects will appear hereinafter in the specification and in the drawings, in which—

Figure 1 is a perspective view of our invention, showing it attached to the front end of an automobile;

Fig. 2 is a fragmentary, perspective view of our improved bumper;

Fig. 3 is a side elevation thereof; and

Fig. 4 is a perspective view of one of the units of our improved bumper.

In the drawings, numeral 1 represents an ordinary automobile, provided with the usual chassis frame 2.

The bumper consists of a substantially U-shaped bumper bar 3, which is adapted to be positioned transversely of the automobile, as usual, and provided with rearwardly curved ends 4.

The bumper bar 3 has secured thereto two sets of bracket members 5. These bracket members 5 may be secured to the bumper bar 3 in any suitable manner, but we have here shown them as having their ends bent right-angularly, as shown at 6, and secured as by rivets 7. These bracket members are bent, as clearly shown in Fig. 2, so as to position the securing ends 6 in a substantially spaced relation, while the other ends 8 of these bracket members 5 are positioned close to one another to provide a guideway to receive the forward end of the members which hold the bumper bar to the chassis of the car. The ends 8 of the bracket members 5 form the outside members of a knife-joint, which allows the bumper bar 3 to be raised vertically.

Secured to the chassis of the car are two arms 9, positioned in the channel portion of the chassis frame 2. These arms are here shown as secured to the chassis 2 at their rear ends by bolt and nut connections 10, and further secured by U-shaped clevis 11, fastened to the chassis frame by bolts 12. By so connecting the arms 9 they are rigidly secured and project forwardly to provide the pivotal support for the bumper bar 3. These arms 9 have formed on their forward ends abutments 13. These abutments are shown as formed integrally upon the upper edge of the arm 9. It is obvious, however, that they may be secured thereon in any suitable manner.

We will now describe the method of attaching the bumper to the arm members 9. The forward ends 14 of the arm members 9 are adapted to lie between the parallel ends 8 of the bracket members 5. The parallel ends 8 of the bracket members 5 are provided with horizontal slots 15, adapted to register with apertures 16 in the forward ends 14 of the arms 9. A bolt 17, provided with washers 18 and a nut 19, forms the pivot for this knife-joint formed by the bracket 5 and the arm 9. The bolt 17 is passed through the slots 15 and the apertures 16 of the bracket 5 and the arm 9, respectively. The nut 19 is then tightened to clamp the washers 18 against the outer faces of the ends 8 of the bracket 5. It will be seen, therefore, that with the bolt 17 acting as a pivot, the ends 8 of the bracket 5 will lie under the abutment 13 and prevent further downward movement of the bumper bar 3, and therefore hold it in a substantially horizontal position. It is also obvious that when it is desired to move the bumper bar 3 upwardly, this may easily be done by grasping the bumper bar 3 and oscillating the same upon the pivots formed by the bolts 17, the abutments 13 not interfering with the corresponding downward movement of the rear ends of the parallel ends 8.

The slots 15 in the ends 8 allow for fore and aft adjustment of the pivot point of this knife-joint connection, so that the rear ends 8 of the bracket 5 will always be positioned under the abutments 13 to retain the bumper in its horizontal position.

From the foregoing it will be seen that we have provided an adjustable bumper which is simple in construction, but which enables the user to quickly and easily swing the bumper bar out of its horizontal position and so enable him to crank the car for starting. It should also be noted that, by reason of the slotted bracket arms of the bumper bar 3, it is unnecessary to exactly locate the points of pivotal connections in the various parts before assembling the bumper on the car, because the manner in which we connect the bumper to the car provides for a varied adjustment thereof.

It is obvious also that we are not limited to a bracket 5 of the exact construction shown, but such bracket may comprise a single arm which carries a pivot 17, and whose end 8 would lie underneath the abutment 13 and maintain the bumper bar 3 in its horizontal or operative position.

Various other modifications may be made in our structure without departing from the spirit and scope of the invention, and we specifically reserve such right.

Having thus described our invention, what we claim is :—

1. An automobile bumper, comprising a bumper bar, two sets of arms forming brackets, arms projecting from the front of an automobile chassis, the free ends of said arms being pivotally connected to said brackets, and means carried by said brackets and arms for maintaining said bumper bar in a substantially horizontal position, substantially as described.

2. In an automobile bumper, a bumper bar, two pairs of brackets secured to said bumper bar and having their ends positioned substantially parallel to form the outer members of a knife joint, two arms projecting from the chassis of an automobile, the free ends of said arms being apertured and projecting between the parallel arms of said brackets, means for pivotally connecting the arms to the brackets, and means carried by said arms for retaining the bumper bar in a substantially horizontal position, as and for the purpose set forth.

3. An automobile bumper, comprising a bumper bar, brackets, each bracket comprising two members, the free ends of said members being positioned parallel to one another and provided with horizontal slots, an automobile chassis, arms secured to said chassis and projecting forwardly therefrom, the free ends of said arms being apertured and adapted to lie between the parallel ends of said brackets, bolts pivotally connecting said brackets to said arms and coöperating with said pivots to position the bumper bar substantially horizontal, as and for the purpose set forth.

4. The combination with an automobile of a fender capable of oscillatory movement, said fender comprising a transversely positioned bumper bar, brackets for said bumper bar, supporting members secured to said automobile, means operatively connecting said brackets and supporting members, and means carried by said supporting members to retain the bumper bar in operative position and to allow it to be moved out of said position, substantially as described.

ERNEST A. ARNOLD.
BRUNO E. ROTHIG.